(12) United States Patent
Bergbom et al.

(10) Patent No.: US 11,128,639 B2
(45) Date of Patent: Sep. 21, 2021

(54) DYNAMIC INJECTION OR MODIFICATION OF HEADERS TO PROVIDE INTELLIGENCE

(71) Applicant: Forcepoint LLC, Austin, TX (US)

(72) Inventors: John Bergbom, Helsinki (FI); Joonas Pihlaja, Helsinki (FI)

(73) Assignee: Forcepoint LLC, Austin, TX (US)

( * ) Notice: Subject to any disclaimer, the term of this patent is extended or adjusted under 35 U.S.C. 154(b) by 240 days.

(21) Appl. No.: 16/405,317

(22) Filed: May 7, 2019

(65) Prior Publication Data
US 2020/0358786 A1  Nov. 12, 2020

(51) Int. Cl.
*H04L 29/06* (2006.01)
(52) U.S. Cl.
CPC ........ *H04L 63/123* (2013.01); *H04L 63/1425* (2013.01); *H04L 63/20* (2013.01)
(58) Field of Classification Search
CPC ... H04L 63/123; H04L 63/1425; H04L 63/20; H04L 63/1416; H04L 63/101; H04W 12/08
USPC .............................................. 726/1
See application file for complete search history.

(56) References Cited

U.S. PATENT DOCUMENTS 9,544,318 B2 *   1/2017   Tatourian ............ H04L 63/1416
10,027,627 B2 *  7/2018   Parla .................... H04L 63/0254

* cited by examiner

*Primary Examiner* — Longbit Chai
(74) *Attorney, Agent, or Firm* — Jackson Walker L.L.P.

(57) ABSTRACT

A method, system, and computer-usable medium are disclosed for receiving a response, by a security management system, from a site external to an internal network comprising the security management system to an endpoint device of the internal network, and injecting a header into the response by the security management system, the header including security rules, such that when the response is communicated to the endpoint device, the endpoint device responds to the security management system with information regarding subsequent requests made by the endpoint device in connection with the response.

18 Claims, 3 Drawing Sheets

DYNAMIC INJECTION OR MODIFICATION OF HEADERS TO PROVIDE INTELLIGENCE

FIELD OF DISCLOSURE

The present invention relates in general to the field of computers and similar technologies, and in particular to software utilized in this field. Still more particularly, it relates to a method, system, and computer-usable medium for performing dynamic injection or modification of headers (e.g., HyperText Transfer Protocol or HyperText Transfer Protocol Secure headers) by a security management system for the purpose of providing intelligence to the security management system.

BACKGROUND

While network communication among networked computers, including the use of the Internet, has many advantages, one downside to network communication is that it may render networked computers susceptible to malicious attacks from viruses or other intrusions. One particular type of intrusion may include the inclusion of malicious elements (e.g., malicious scripts) into content that otherwise appears benign.

For example, content from a malicious external host (whether created for malicious purposes, or if originally benign but compromised and modified) may be loaded when a victim's web browser makes a request to a website, and such malicious content may attack the victim's own device or other devices residing in an internal network. Such a website may be a benign website that has been compromised and modified such that it loads a malicious script from a malicious site, or as mentioned above, may be a website purposely designed to perform malicious actions. The "same-origin" policy may not sufficiently prevent such an attack. The same-origin policy may disallow reading a cross-origin response, but does not prevent sending a cross-origin request. By using side-channel attacks, the mere sending of a request is sufficient for an attacker to discover internal network hosts, performing portscanning, fingerprinting of internal services, and even compromising of internal hosts. To address such problems, some web browsers support a Content Security Policy (CSP) which is a HyperText Transfer Protocol (HTTP) or HyperText Transfer Protocol Secure (HTTPS) header added to HTTP/HTTPS responses. Such a header may implement a whitelisting strategy defining the hosts with which a web page is permitted to interact. However, CSP does not provide protection if CSP is not configured (e.g., either by a non-malicious website or purposefully not configured by a malicious website), if CSP is misconfigured, or if CSP has been configured correctly by a non-malicious website but subsequently becomes compromised by an attacker.

As another example, in some instances non-malicious websites become compromised, and the attacker may change the functionality of the web site to make such compromised web site communicate with a malicious server. A technique may be desired to detect when such a compromise occurs.

As a further example, in the context of a security device (e.g., a firewall) allowing or blocking network traffic, it is often difficult for a firewall to determine which HTTP/HTTPS connections are related. In a basic scenario, a security device may only be able to determine which network addresses made a connection to another network address. Thus, it may be desirable to determine more details about related connections (e.g., what causes a certain connection from a host) in order to give more intelligence to a network security device upon which to base its decisions.

SUMMARY

In accordance with the teachings of the present disclosure, certain disadvantages and problems associated with existing approaches to network and data security have been reduced or eliminated.

In accordance with embodiments of the present disclosure, a computer-implementable method may include receiving a response, by a security management system, from a site external to an internal network comprising the security management system to an endpoint device of the internal network, and adding header information into the response by the security management system, the header information including security rules, such that when the response is communicated to the endpoint device, the endpoint device responds to the security management system with information regarding subsequent requests made by the endpoint device in connection with the response.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for receiving a response, by a security management system, from a site external to an internal network comprising the security management system to an endpoint device of the internal network, and adding header information into the response by the security management system, the header information including security rules, such that when the response is communicated to the endpoint device, the endpoint device responds to the security management system with information regarding subsequent requests made by the endpoint device in connection with the response.

In accordance with these and other embodiments of the present disclosure, a non-transitory, computer-readable storage medium may embody computer program code, the computer program code comprising computer executable instructions configured for receiving a response, by a security management system, from a site external to an internal network comprising the security management system to an endpoint device of the internal network, and adding header information into the response by the security management system, the header information including security rules, such that when the response is communicated to the endpoint device, the endpoint device responds to the security management system with information regarding subsequent requests made by the endpoint device in connection with the response.

Technical advantages of the present disclosure may be readily apparent to one having ordinary skill in the art from the figures, description and claims included herein.

The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregation of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
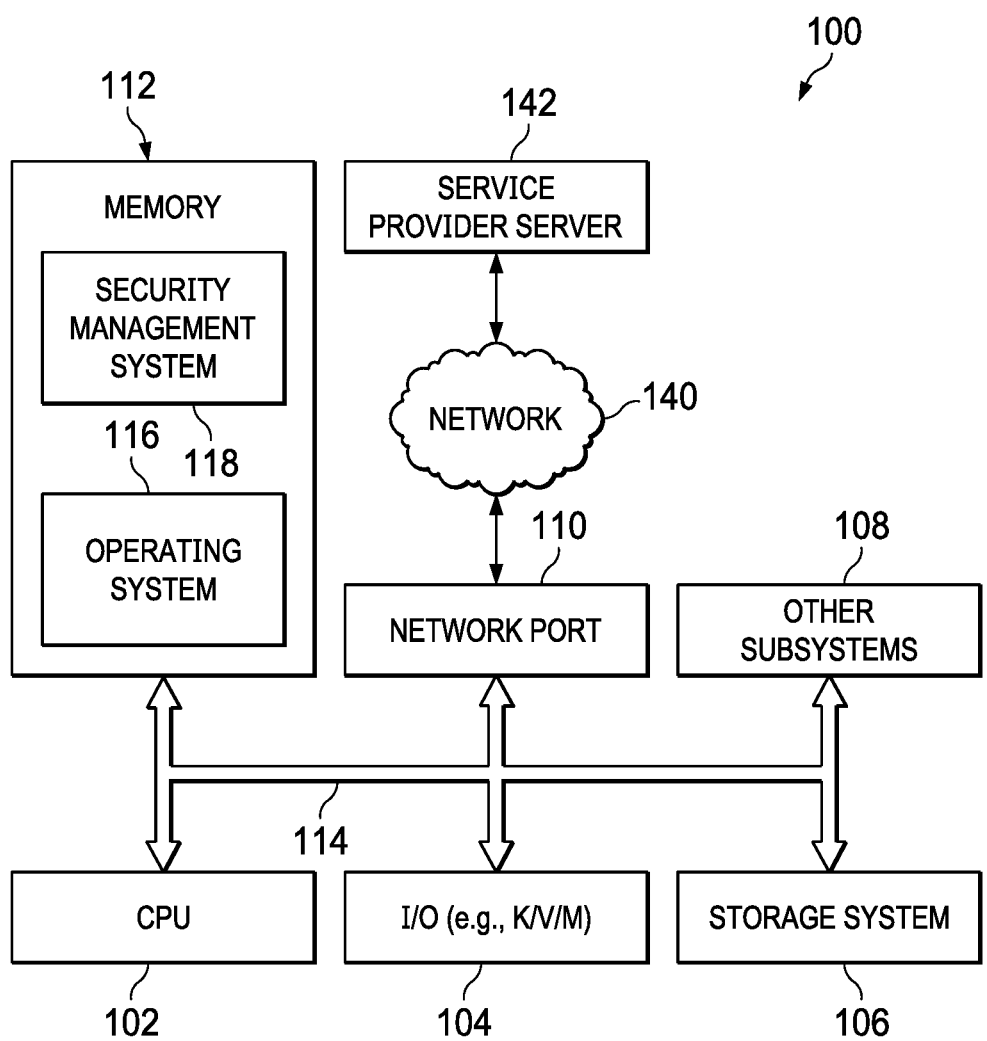
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142. In some embodiments, service provider server 142 may reside external to an internal network of information handling system 100 (e.g., in a public network cloud, outside a firewall perimeter which information handling system 100 resides within).

In various embodiments, security management system 118 may (as described in greater detail below) be configured to perform dynamic injection or modification of headers, such as HTTP/HTTPS headers, to provide intelligence for performing security operations, such as those operations performed by a security device. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security and performing network security operations with greater efficiency and with decreased processing resources by enabling dynamic injection or modification of headers to provide intelligence.

Figure 2:
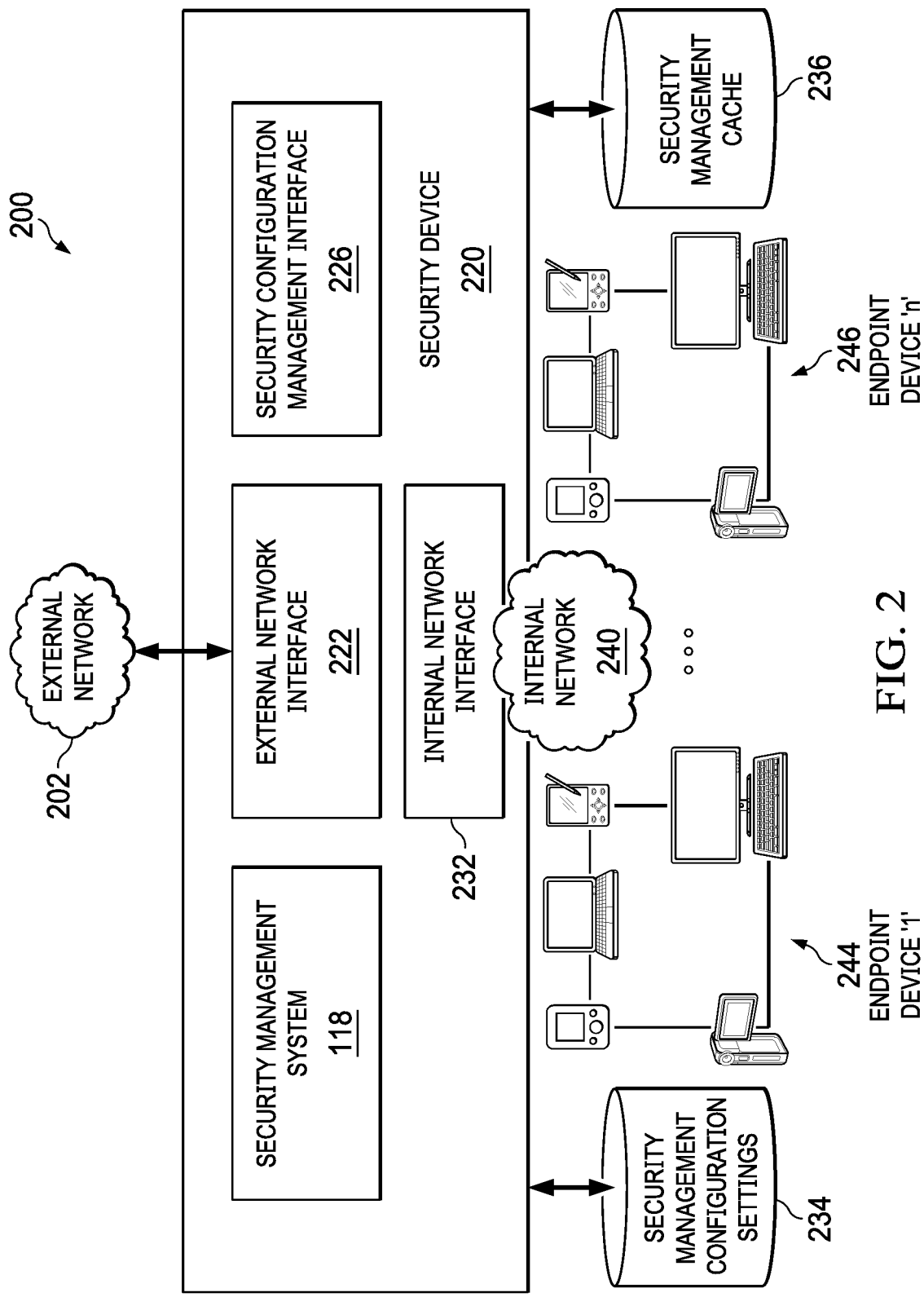
FIG. 2 illustrates a block diagram of a system for performing dynamic injection or modification of headers to provide intelligence, in accordance with embodiments of the present disclosure.

FIG. 2 illustrates a block diagram of a system 200 for performing dynamic injection or modification of headers to provide intelligence, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling injection or modification of headers to provide intelligence, as described herein. For example, security management system 118 may dynamically inject a header (e.g., a CSP header or other suitable header) into a response from an external site (e.g., from external network 202). Security management system 118 may also include non-blocking, report-only security rules within the header, such that the security rules do not block connections violating the security rules, but report the occurrences of such violations. For example, an injected CSP header may be configured to not allow any actions, and may include a rule to send violation reports to the Uniform Resource Locator (URL) of security management system 118 itself, so that the security rules of the CSP header report (as "violations") all subsequent requests made by the web page in which the header is injected. In some embodiments, the security rules may allow for ignoring (e.g., allowing) connections to large and/or well-known hosts to prevent triggering a report for such hosts.

Accordingly, the use of such header may cause reporting of connections (e.g., by an endpoint device 244, 246 reading and rendering the webpage) to security management system 118, thus allowing security management system 118 to determine in real time with which hosts the webpage communicates. Upon receiving such telemetry data from an endpoint device 244, 246 regarding the host to which a webpage attempts to connect, security management system 118 (e.g., being implemented by security device 220) may determine if any of such hosts reside at a place in which connections should not be allowed (e.g., hosts within an internal network of the endpoint device 244, 246 if the web page was loaded from external network 202) and take remedial action. Because the dynamically-added security rule is non-blocking, the very first malicious connection may be allowed, but because security management system 118 may immediately discover the violation, any subsequent requests can be blocked as a remedial action. For example, security management system 118 may block subsequent attempts at accessing the website generating the violation, or potentially allow access to the website, but dynamically add a blocking rule (e.g., within a firewall or with another CSP header) that prevents the discovered violation.

In some embodiments, security management system 118 may be configured to block violations such that not even the first malicious connection is allowed. For example, an initial request could be delayed by security management system 118 while the security management system 118 determines whether a security rule is violated, and the request can then be blocked if a violation is detected.

Inserting a security rule into a header as described above may allow security management system 118 to not only detect unwanted connections as described above, but may also allow security management system 118 to perform a session-based recording of an association of activities of a website, in a manner similar to that described in U.S. patent application Ser. No. 16/275,557, filed Feb. 14, 2019, and entitled "Session-Based Recording of Association of Activities." In order words, upon receiving such telemetry data from an endpoint device 244, 246 regarding the host to which a webpage attempts to connect, security management system 118 may create a "fingerprint" of the various connections that the webpage makes. By comparing such fingerprint to a fingerprint created during a previous access to the webpage, security management system 118 may determine if changes to the webpage have occurred that indicate the presence of malicious content.

Such insertion of a security rule into a header as described above may also provide security management system 118 with real-time information regarding which website caused a certain connection upon which data analysis can be performed. Accordingly, security management system 118 may be able to correlate actions and consequences, to draw conclusions regarding normal activity and abnormal activity, and, in some instances, to differentiate activity initiated by bots and malware from activity initiated by a human user. More detailed connection information may also enable statistics that may be useful in analytics.

Although the foregoing contemplates injecting or modifying CSP header information into an HTTP/HTTPS response, any other suitable HTTP/HTTPS header may be injected or modified. In addition, although the foregoing contemplates use of injection or modification of headers by security management system 118 residing within a security device 220, in some embodiments, such functionality may be implemented at an endpoint device 244, 246, for example by a browser extension or browser plugin capable of injecting or modifying HTTP/HTTPS headers, or by an installable endpoint agent that functions as an HTTP/HTTPS proxy.

Figure 3:
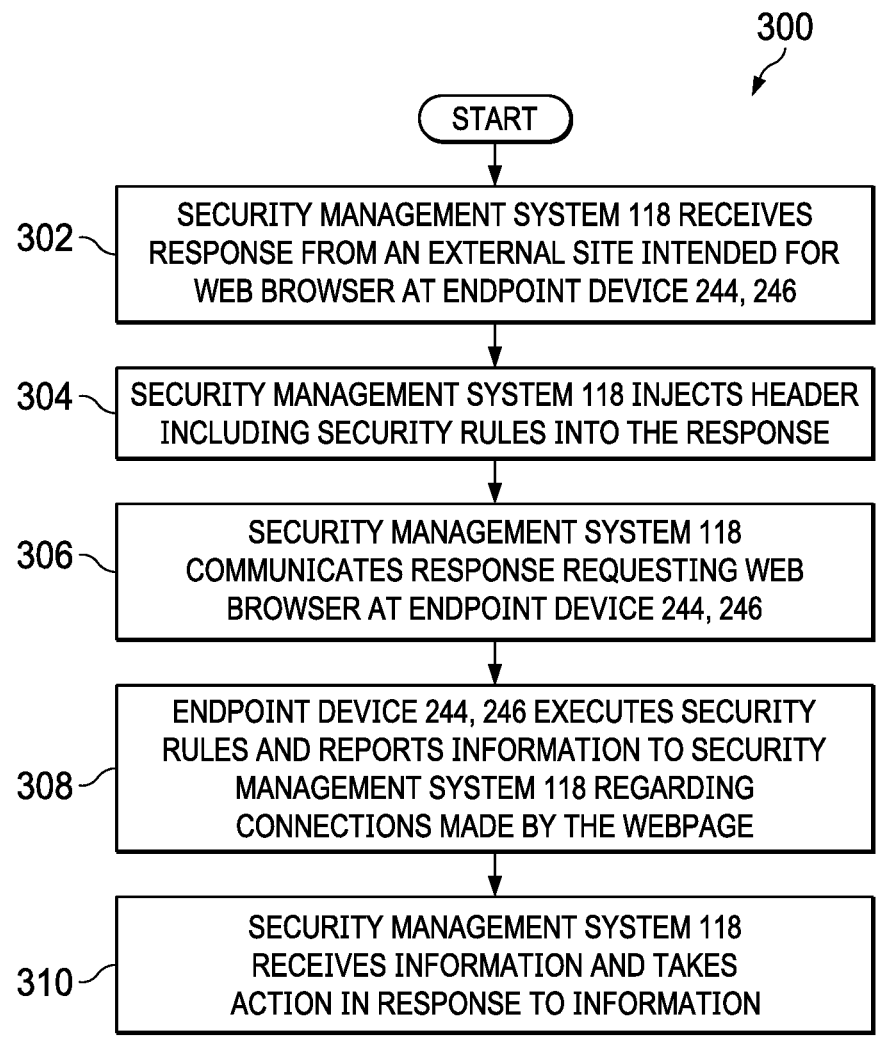
FIG. 3 illustrates a flow chart of an example method for dynamic injection or modification of headers to provide intelligence, in accordance with embodiments of the present disclosure.

FIG. 3 illustrates a flow chart of an example method 300 for performing dynamic injection or modification of headers to provide intelligence, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, security management system 118 may receive a response from an external site (e.g., within external network 202) intended for a web browser at an endpoint device 244, 246. At step 304, security management system 118 may inject or otherwise add a header (e.g., a CSP header or other suitable header) into the response, the header including security rules as described above. Alternatively, in some embodiments, security management system may modify an existing header of the response, adding header information including security rules. At step 306, security management system 118 may communicate the response to the requesting web browser at an endpoint device 244, 246. At step 308, in accordance with the injected header, the endpoint device 244, 246 may execute the security rules and report information to security management system 118 regarding connections made by the webpage. At step 310, security management system 118 may receive the information and take action in response to the information, including but not limited to: determining if malicious activities occurred (e.g., connections are to hosts to which connections should not be allowed), taking remedial action in response to malicious activities, performing session-based recording of an association of activities of a website (e.g., "fingerprinting" connections by a website), and/or performing data analysis on the information.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

Although the foregoing contemplates that security management system 118 resides in security device 220, in some embodiments, security management system 118 may be implemented by a device external to security device 220, including without limitation a device within external network 202, and an endpoint device 244, 246.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implemented method for dynamic injection of security headers comprising:
a security management system receiving a response from a site external to an internal network that comprises the security management system, wherein the response was sent to an endpoint device of the internal network; and
the security management system injecting header information into the response, the injected header information including security rules that comprise non-blocking, report-only security rules, such that the injected header is configured not to block connections violating the security rules but to send violation reports to a uniform resource locator (URL) of the security management system upon subsequent requests made by the endpoint device in connection with the response.

2. The method of claim 1, wherein the header information comprises a Content Security Policy header.

3. The method of claim 1, further comprising, responsive to receipt of the information regarding subsequent requests made by the endpoint device in connection with the response:
determining which of the connections are potentially malicious; and
taking remedial action with respect to the connections which are potentially malicious.

4. The method of claim 3, wherein determining which of the connections are potentially malicious comprises determining which of the connections are to a host on the internal network.

5. The method of claim 1, further comprising, responsive to receipt of the information regarding subsequent requests made by the endpoint device in connection with the response, performing a session-based recording of an association of activities of a website associated with the response.

6. The method of claim 1, further comprising, responsive to receipt of the information regarding subsequent requests made by the endpoint device in connection with the response, performing one or more of:
   correlating actions associated with the response and corresponding consequences associated with the response;
   distinguishing between normal activity and abnormal activity of a website associated with the response; and
   differentiating activity initiated by bots and malware from activity initiated by a human user.

7. A system for dynamic injection of security headers comprising:
   a hardware processor; and
   a non-transitory, computer-readable storage medium comprising instructions executable by the hardware processor and configured for:
      receiving a response, by a security management system, from a site external to an internal network that comprises the security management system, wherein the response was sent to an endpoint device of the internal network; and
      injecting header information into the response by the security management system, the injected header information including security rules that comprise non-blocking, report-only security rules, such that the injected header is configured not to block connections violating the security rules but to send violation reports to a uniform resource locator (URL) of the security management system upon subsequent requests made by the endpoint device in connection with the response.

8. The system of claim 7, wherein the header information comprises a Content Security Policy header.

9. The system of claim 7, the instructions further configured for, responsive to receipt of the information regarding subsequent requests made by the endpoint device in connection with the response:
   determining which of the connections are potentially malicious; and
   taking remedial action with respect to the connections which are potentially malicious.

10. The system of claim 9, wherein determining which of the connections are potentially malicious comprises determining which of the connections are to a host on the internal network.

11. The system of claim 7, the instructions further configured for, responsive to receipt of the information regarding subsequent requests made by the endpoint device in connection with the response, performing a session-based recording of an association of activities of a website associated with the response.

12. The system of claim 7, the instructions further configured for, responsive to receipt of the information regarding subsequent requests made by the endpoint device in connection with the response, performing one or more of:
   correlating actions associated with the response and corresponding consequences associated with the response;
   distinguishing between normal activity and abnormal activity of a website associated with the response; and
   differentiating activity initiated by bots and malware from activity initiated by a human user.

13. An article of manufacture for dynamic injection of security headers comprising a non-transitory, computer-readable medium embodying computer-executable instructions configured for:
   receiving a response, by a security management system, from a site external to an internal network that comprises the security management system, wherein the response was sent to an endpoint device of the internal network; and
   injecting header information into the response by the security management system, the injected header information including security rules that comprise non-blocking, report-only security rules, such that the injected header is configured not to block connections violating the security rules but to send violation reports to a uniform resource locator (URL) of the security management system upon subsequent requests made by the endpoint device in connection with the response.

14. The article of claim 13, wherein the header information comprises a Content Security Policy header.

15. The article of claim 13, the instructions further configured for, responsive to receipt of the information regarding subsequent requests made by the endpoint device in connection with the response:
   determining which of the connections are potentially malicious; and
   taking remedial action with respect to the connections which are potentially malicious.

16. The article of claim 15, wherein determining which of the connections are potentially malicious comprises determining which of the connections are to a host on the internal network.

17. The article of claim 13, the instructions further configured for, responsive to receipt of the information regarding subsequent requests made by the endpoint device in connection with the response, performing a session-based recording of an association of activities of a website associated with the response.

18. The article of claim 13, the instructions further configured for, responsive to receipt of the information regarding subsequent requests made by the endpoint device in connection with the response, performing one or more of:
   correlating actions associated with the response and corresponding consequences associated with the response;
   distinguishing between normal activity and abnormal activity of a website associated with the response; and
   differentiating activity initiated by bots and malware from activity initiated by a human user.

* * * * *